(12) United States Patent
Birsan et al.

(10) Patent No.: US 11,836,523 B2
(45) Date of Patent: *Dec. 5, 2023

(54) INTROSPECTION OF A CONTAINERIZED APPLICATION IN A RUNTIME ENVIRONMENT

(71) Applicant: Red Hat, Inc., Raleigh, NC (US)

(72) Inventors: Valentina Birsan, Markham (CA); Feng Xiang, Markham (CA)

(73) Assignee: Red Hat, Inc., Raleigh, NC (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/082,725

(22) Filed: Oct. 28, 2020

(65) Prior Publication Data

US 2022/0129313 A1    Apr. 28, 2022

(51) Int. Cl.
*G06F 9/50*   (2006.01)
*G06F 3/14*   (2006.01)
*H04L 67/10*  (2022.01)

(52) U.S. Cl.
CPC .................. *G06F 9/50* (2013.01); *G06F 3/14* (2013.01); *H04L 67/10* (2013.01)

(58) Field of Classification Search
CPC .............. G06F 9/50; G06F 3/14; H04L 67/10
See application file for complete search history.

(56) References Cited

U.S. PATENT DOCUMENTS

| 7,409,586 | B1 * | 8/2008 | Bezbaruah | .......... G06F 11/0793 |
| | | | | 714/13 |
| 8,479,098 | B2 | 7/2013 | Kimmet | |
| 8,516,477 | B1 | 8/2013 | Kearns et al. | |
| 9,043,786 | B1 | 5/2015 | Hodge et al. | |
| 9,256,467 | B1 | 2/2016 | Singh et al. | |

(Continued)

FOREIGN PATENT DOCUMENTS

| CN | 107908521 A | 4/2018 |
| CN | 110262944 A | 9/2019 |

(Continued)

OTHER PUBLICATIONS

Author Unknown, "Access Kubernetes Resources from the Azure Portal," Microsoft, Dec. 16, 2020, https://docs.microsoft.com/en-us/azure/aks/kubernetes-portal, 6 pages.

(Continued)

*Primary Examiner* — Ninos Donabed
(74) *Attorney, Agent, or Firm* — Dority & Manning, P.A.

(57) ABSTRACT

Introspection of a containerized application in a runtime environment is disclosed. Application information that identifies a plurality of resources that compose an application is obtained. Based on the application information, deployment information for one or more of the plurality of resources is requested from a first cluster controller of a first cluster. The first cluster controller is configured to control resources implemented on a plurality of different nodes of the first cluster. Based on the application information and the deployment information, user interface imagery is generated that identifies at least some of the resources and a corresponding deployment status of the at least some of the resources. The user interface imagery is presented on a display device.

13 Claims, 10 Drawing Sheets

(56) References Cited

U.S. PATENT DOCUMENTS

| | | | |
|---|---|---|---|
| 9,319,286 B2 | 4/2016 | Panuganty | |
| 9,645,805 B2 | 5/2017 | Govindaraju et al. | |
| 9,645,858 B2 | 5/2017 | Winterfeldt et al. | |
| 9,727,439 B2 | 8/2017 | Mohammed et al. | |
| 9,805,322 B2 | 10/2017 | Kelkar et al. | |
| 10,284,685 B2 | 5/2019 | Bauer et al. | |
| 10,505,815 B2 | 12/2019 | Padala et al. | |
| 10,581,705 B2 | 3/2020 | Patil et al. | |
| 10,860,622 B1 | 12/2020 | Florissi | |
| 10,868,742 B2 | 12/2020 | Chitalia et al. | |
| 2004/0015581 A1* | 1/2004 | Forbes | H04L 67/101 709/224 |
| 2006/0136570 A1* | 6/2006 | Pandya | G06F 16/951 709/217 |
| 2008/0191009 A1* | 8/2008 | Gressel | H04W 4/021 235/382 |
| 2012/0300667 A1* | 11/2012 | Dalsgaard | H04L 5/001 370/252 |
| 2014/0223012 A1* | 8/2014 | Agarwala | H04L 41/0894 709/226 |
| 2014/0289474 A1* | 9/2014 | Aoyagi | G06F 12/0804 711/143 |
| 2014/0289481 A1* | 9/2014 | Aoyagi | G06F 12/0826 711/143 |
| 2014/0297957 A1* | 10/2014 | Aoyagi | G06F 12/0804 711/120 |
| 2014/0297966 A1* | 10/2014 | Aoyagi | G06F 12/0817 711/141 |
| 2014/0380087 A1* | 12/2014 | Jamjoom | G06F 11/2028 714/4.11 |
| 2015/0229532 A1 | 8/2015 | Somaiya et al. | |
| 2015/0371522 A1* | 12/2015 | Mravyan | H04W 4/80 340/573.1 |
| 2016/0119876 A1* | 4/2016 | Gopal | H04W 52/0251 370/252 |
| 2016/0182397 A1 | 6/2016 | McFarlin et al. | |
| 2016/0292578 A1 | 10/2016 | Ashenfelter | |
| 2017/0339008 A1* | 11/2017 | Dion | H04L 12/4641 |
| 2018/0287902 A1* | 10/2018 | Chitalia | G06F 11/3433 |
| 2018/0293394 A1* | 10/2018 | Gunda | G06F 9/45558 |
| 2018/0349199 A1* | 12/2018 | Vyas | G06F 11/3006 |
| 2019/0066368 A1* | 2/2019 | Paul | B60K 37/02 |
| 2019/0123983 A1* | 4/2019 | Rao | H04L 43/062 |
| 2019/0182101 A1* | 6/2019 | Kulshreshtha | H04L 41/0631 |
| 2019/0318338 A1* | 10/2019 | Verma | H04L 9/0637 |
| 2020/0014607 A1 | 1/2020 | Gangadhar et al. | |
| 2020/0065080 A1* | 2/2020 | Myneni | H04L 63/1408 |
| 2020/0065166 A1* | 2/2020 | Myneni | G06F 9/5061 |
| 2020/0218580 A1 | 7/2020 | Kim | |
| 2020/0348984 A1 | 11/2020 | Giannetti et al. | |
| 2021/0026720 A1* | 1/2021 | Jain | H04L 63/1425 |
| 2021/0026863 A1* | 1/2021 | Mordani | G06F 7/14 |
| 2021/0028996 A1* | 1/2021 | Mordani | H04L 41/40 |
| 2021/0029002 A1* | 1/2021 | Mordani | H04L 43/022 |
| 2021/0029051 A1* | 1/2021 | Mordani | H04L 41/0654 |
| 2021/0200814 A1 | 7/2021 | Tal et al. | |

FOREIGN PATENT DOCUMENTS

| | | |
|---|---|---|
| WO | 2014145777 A1 | 9/2014 |
| WO | 2020017844 A1 | 1/2020 |

OTHER PUBLICATIONS

Author Unknown, "Application and Hybrid Application Resources," IBM Corporation, 2020, https://www.ibm.com/docs/en/cloud-paks/cp-management/2.2.x?topic=management-application-resources, 9 pages.

Author Unknown, "How to use the Pega Autonomic Event Services Enterprise Health console," Pegasystems Inc., Sep. 25, 2019, https://community.pega.com/knowledgebase/articles/pega-autonomic-event-services/how-use-pega-autonomic-event-services-enterprise-health-console, 24 pages.

Author Unknown, "Viewing application composition using the Topology view," Red Hat, Feb. 2020, https://docs.openshift.com/container-platform/4.2/applications/application_life_cycle_management/odc-viewing-application-composition-using-topology-view.html, 9 pages.

Author Unknown, "Web UI (Dashboard)," The Linux Foundation, May 12, 2021, https://kubernetes.io/docs/tasks/access-application-cluster/web-ui-dashboard/, 5 pages.

Casperson, M., "Alternative Kubernetes Dashboards," Octopus Deploy, Sep. 22, 2020, https://octopus.com/blog/alternative-kubernetes-dashboards, 14 pages.

Haider, H., "The Ultimate Guide to the Kubernetes Dashboard: How to Install, Access, Authenticateand Add Heapster Metrics," replex, Apr. 19, 2019, https://www.replex.io/blog/how-to-install-access-and-add-heapster-metrics-to-the-kubernetes-dashboard, 15 pages.

Maenhaut, Pieter-Jan, et al., "Resource Management in a Containerized Cloud: Status and Challenges," Journal of Network and Systems Management, Nov. 2019, 51 pages.

Muralidharan, Shapna, et al., "Monitoring and Managing IoT Applications in Smart Cities Using Kubernetes," Cloud Computing 2019 : The Tenth International Conference on Cloud Computing, GRIDs, and Virtualization, 2019, 7 pages.

Calasanz, Rafael Tolosana, et al., "Towards the Scientific Cloud Workflow Architecture*," 5th International Workshop on Advances in ICT Infrastructures and Services (Advance 2017), Jan. 2017, Evry, France, 11 pages.

Nguyen, Dinh Khoa, et al., "Blueprinting Approach in Support of Cloud Computing," Future Internet 2012, 4, 322-346; doi:10.3390/fi4010322, Mar. 21, 2012, 26 pages.

Non-Final Office Action for U.S. Appl. No. 17/107,355, dated Sep. 14, 2022, 33 pages.

Final Office Action for U.S. Appl. No. 17/107,355, dated Feb. 13, 2023, 30 pages.

Office Action for U.S. Appl. No. 17/107,355, dated Oct. 12, 2023, 24 pages.

* cited by examiner

INTROSPECTION OF A CONTAINERIZED APPLICATION IN A RUNTIME ENVIRONMENT

BACKGROUND

Container orchestration systems automate the deployment, scaling, and management of containerized applications among nodes in a cluster.

SUMMARY

The examples disclosed herein implement introspection of a containerized application in a runtime environment. The examples obtain application information that identifies resources that compose a containerized application, and request, from a cluster controller on which the containerized application is supposed to be deployed, deployment information for each resource. Application resource deployment information is generated that identifies, for each resource, a deployment status on the cluster. User interface imagery identifying at least some of the resources is presented on a display device with corresponding deployment status information.

In one example a method is provided. The method includes obtaining, by a computing device comprising a processor device, application information that identifies a plurality of resources that compose an application. The method further includes requesting, from a first cluster controller of a first cluster, based on the application information, deployment information for one or more of the plurality of resources, wherein the first cluster controller is configured to control resources implemented on a plurality of different nodes of the first cluster. The method further includes generating, based on the application information and the deployment information, user interface imagery identifying at least some of the resources and a corresponding deployment status of the at least some of the resources. The method further includes presenting, on a display device, the user interface imagery.

In another example a computing device is provided. The computing device includes a memory and a processor device coupled to the memory. The processor device is to obtain application information that identifies a plurality of resources that compose an application. The processor device is further to request, from a first cluster controller of a first cluster, based on the application information, deployment information for one or more of the plurality of resources, wherein the first cluster controller is configured to control resources implemented on a plurality of different nodes of the first cluster. The processor device is further to generate, based on the application information and the deployment information, user interface imagery identifying at least some of the resources and a corresponding deployment status of the at least some of the resources. The processor device is further to present, on a display device, the user interface imagery.

In another example a non-transitory computer-readable storage medium is provided. The non-transitory computer-readable storage medium includes executable instructions to cause a processor device to obtain application information that identifies a plurality of resources that compose an application. The instructions further cause the processor device to request, from a first cluster controller of a first cluster, based on the application information, deployment information for one or more of the plurality of resources, wherein the first cluster controller is configured to control resources implemented on a plurality of different nodes of the first cluster. The instructions further cause the processor device to generate, based on the application information and the deployment information, user interface imagery identifying at least some of the resources and a corresponding deployment status of the at least some of the resources. The instructions further cause the processor device to present, on a display device, the user interface imagery.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
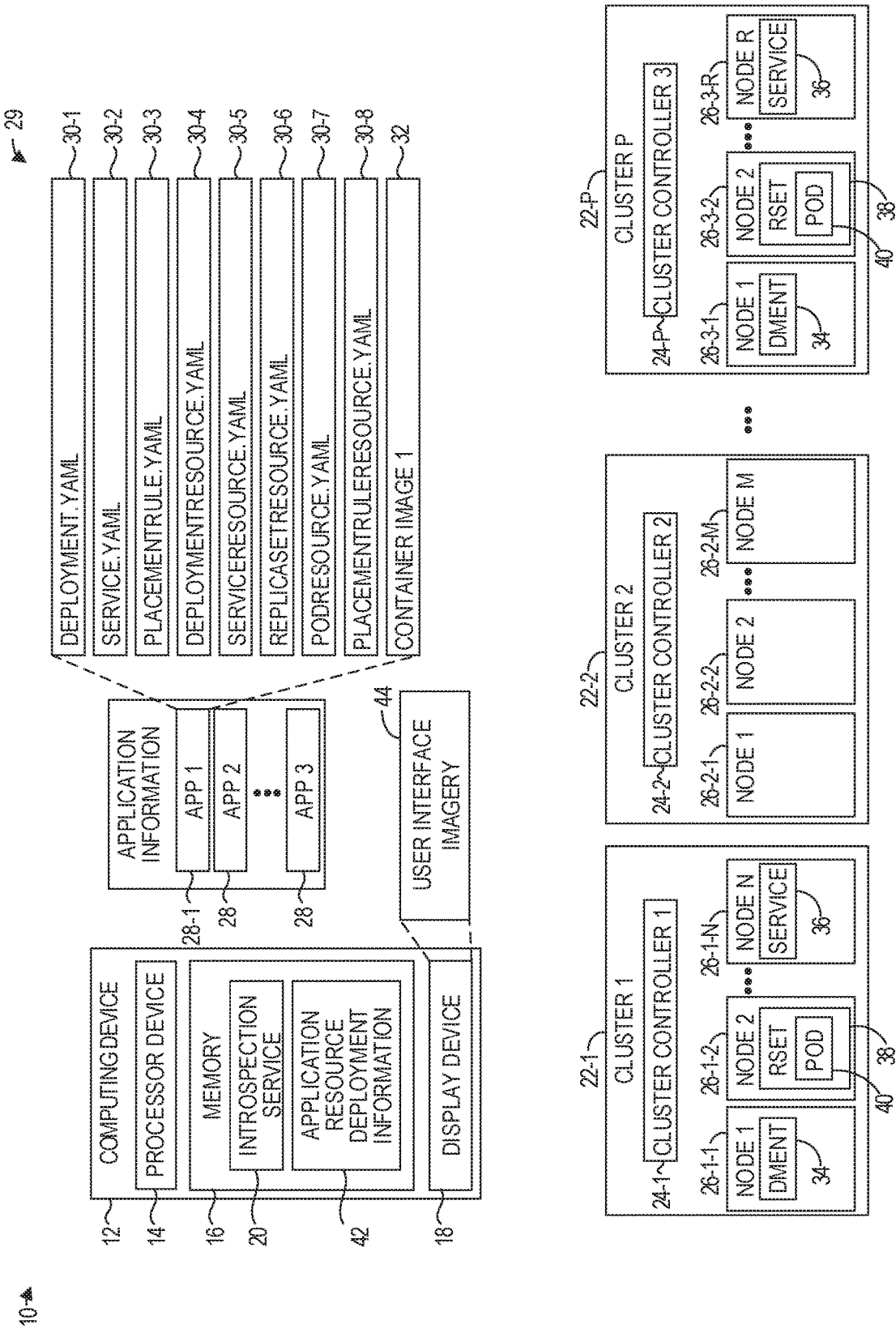
FIG. 1 is a block diagram of a runtime environment in which examples of introspection of a containerized application in a runtime environment can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Container orchestration systems automate the deployment, scaling, and management of containerized applications among nodes in a cluster. A containerized application may include tens or hundreds of different containers and other resources, and each container or resource may have any number of instances distributed over many different nodes in a cluster. Increasingly, especially in conjunction with cloud computing environments, a containerized application may be distributed over many different nodes in several different clusters.

Determining a deployment status of a containerized application can be difficult, time-consuming, and require relatively specialized knowledge. An operator may first have to determine the various resources and containers that make up the containerized application, then determine on which clusters the containerized application is supposed to be deployed, and then determine the individual statuses of the resources of the containerized application on each cluster.

The examples disclosed herein implement introspection of a containerized application in a runtime environment. The examples obtain application information that identifies resources that compose a containerized application, and request, from a cluster controller on which the containerized application is supposed to be deployed, deployment information for each resource. Application resource deployment information is generated that identifies, for each resource, a deployment status on the cluster. User interface imagery identifying at least some of the resources is presented on a display device with corresponding deployment status information.

The term "containerized application" as used herein refers to an application that comprises one or more container images, and is initiated and managed via a container orchestration system. When executed, a container image is initiated as a Linux® container, wherein the Linux® kernel features cgroups and namespaces are used to isolate processes from one another. A container image is often created from a containerization technology, such as, by way of non-limiting example, Docker®, or the like. The term "container orchestration system" refers to a system that automates the deployment, scaling and management of containerized applications among nodes in a cluster. The Kubernetes® container orchestration system (Kubernetes.io) is one example of a container orchestration system. The term "resource" as used herein refers to any individual component managed by the container orchestration system for which, if requested, the container orchestration system will return information specific to the resource. In the Kubernetes® container orchestration system, each resource of an application is typically defined in a YAML Ain't Markup Language (YAML) file and has a "kind" attribute (sometimes referred to herein as "type") and a "name" attribute.

The examples will be discussed herein in the context of the Kubernetes® container orchestration system and utilize terminology used in the Kubernetes® container orchestration system; however, the examples are applicable to any container orchestration system capable of deploying, scaling, and managing containerized applications among nodes in a cluster.

FIG. 1 is a block diagram of a runtime environment 10 in which examples of introspection of a containerized application in a runtime environment can be practiced. The runtime environment 10 includes a computing device 12, which in turn includes a processor device 14, a memory 16, and a display device 18. The memory 16 includes an introspection service 20. The introspection service 20, as will described in greater detail herein, implements introspection of a containerized application in a runtime environment. It is noted that while the introspection service 20 is a component of the computing device 12, functionality implemented by the introspection service 20 may be attributed to the computing device 12 generally. Moreover, in examples where the introspection service 20 comprises software instructions that program the processor device 14 to carry out functionality discussed herein, functionality implemented by the introspection service 20 may be attributed herein to the processor device 14. It is further noted that while the examples will be described as being implemented on the computing device 12 by the introspection service 20, it is apparent that the introspection service 20 could comprise a number of different components, some of which may execute concurrently on other computing devices.

The runtime environment 10 includes a plurality of clusters 22-1-22-P (generally, clusters 22). The cluster 22-1 includes a container orchestration system in the form of a cluster controller 24-1 that deploys, scales, and manages containerized applications by distributing resources across a plurality of nodes 26-1-1-26-1-N. The container orchestration system may comprise any suitable container orchestration system capable of deploying containerized application across a cluster of nodes. In some implementations, the container orchestration system comprises the Kubernetes® container orchestration system. While the container orchestration system, solely for purposes of illustration, is illustrated as a single component embodied in the cluster controller 24-1, in practice, the container orchestration system may be implemented by any number of modules, and may be in part distributed across the nodes 26-1-1-26-1-N. Each node 26-1-1-26-1-N may comprise a computing host (e.g., a bare metal machine), or a virtual machine. The cluster 22-2 includes a cluster controller 24-2 and a plurality of nodes 26-2-1-26-2-M, and the cluster 22-P includes a cluster controller 24-P and a plurality of nodes 26-3-1-26-3-R.

The runtime environment 10 includes a plurality of containerized applications 28-1, 28 (hereinafter "applications" for purposes of brevity) that can be deployed on one or more of the clusters 22. The application 28-1 includes application information 29 in the form of one or more YAML files 30-1-30-8, some of which define resources that will be used for the application 28-1, and one or more container images 32. As will be discussed in greater detail below with reference to FIG. 3, the YAML files 30-1-30-3 are pre-deployment YAML files, and the YAML files 30-4-30-8 are resource YAML files generated during deployment and that define resources that will provide functionality of the application 28-1.

In this example, the YAML file 30-4 defines a deployment (DMENT) resource 34 that has been deployed by the cluster controller 24-1 on the node 26-1-1 of the cluster 22-1, and that has also been deployed by the cluster controller 24-P on the node 26-3-1 of the cluster 22-P. The YAML file 30-5 defines a service resource 36 that has been deployed by the cluster controller 24-1 on the node 26-1-N of the cluster 22-1, and has also been deployed by the cluster controller 24-P on the node 26-3-R of the cluster 22-P. The YAML file 30-6 defines a replicaset (RSET) resource 38 that has been deployed by the cluster controller 24-1 on the node 26-1-2 of the cluster 22-1, and has also been deployed by the cluster controller 24-P on the node 26-3-2 of the cluster 22-P. The YAML file 30-7 defines a pod resource 40 that has been deployed by the cluster controller 24-1 on the node 26-1-2 of the cluster 22-1, and has also been deployed by the cluster controller 24-P on the node 26-3-2 of the cluster 22-P. The pod resources 40 include the container initiated from the container image 32. The YAML file 30-8 defines a placement rule resource that identifies the clusters 22-1 and 22-P as clusters 22 to which the application 28-1 is to be deployed.

The introspection service 20 is configured to access the application information 29 associated with the application 28-1 to identify the resources that compose the application 28-1. The introspection service 20 then requests from the cluster controllers 24-1 and 24-P deployment information for each of the resources. In response, the cluster controllers 24-1 and 24-P provide a deployment status for each of the resources, such as, by way of non-limiting example, deployed or not deployed. In some implementations, the introspection service 20 may generate, based on the application information 29 and the deployment information, application resource deployment information 42 that correlates the deployment information received from the cluster controllers 24-1 and 24-P with the resources of the application 28-1. The introspection service 20 may then generate and display user interface imagery 44 on the display device 18 that identifies at least some of the resources and the corresponding deployment status. In this manner, an operator can quickly and easily ascertain the deployment status of the application 28-1 across the clusters 22-1-22-P.

Figure 2:
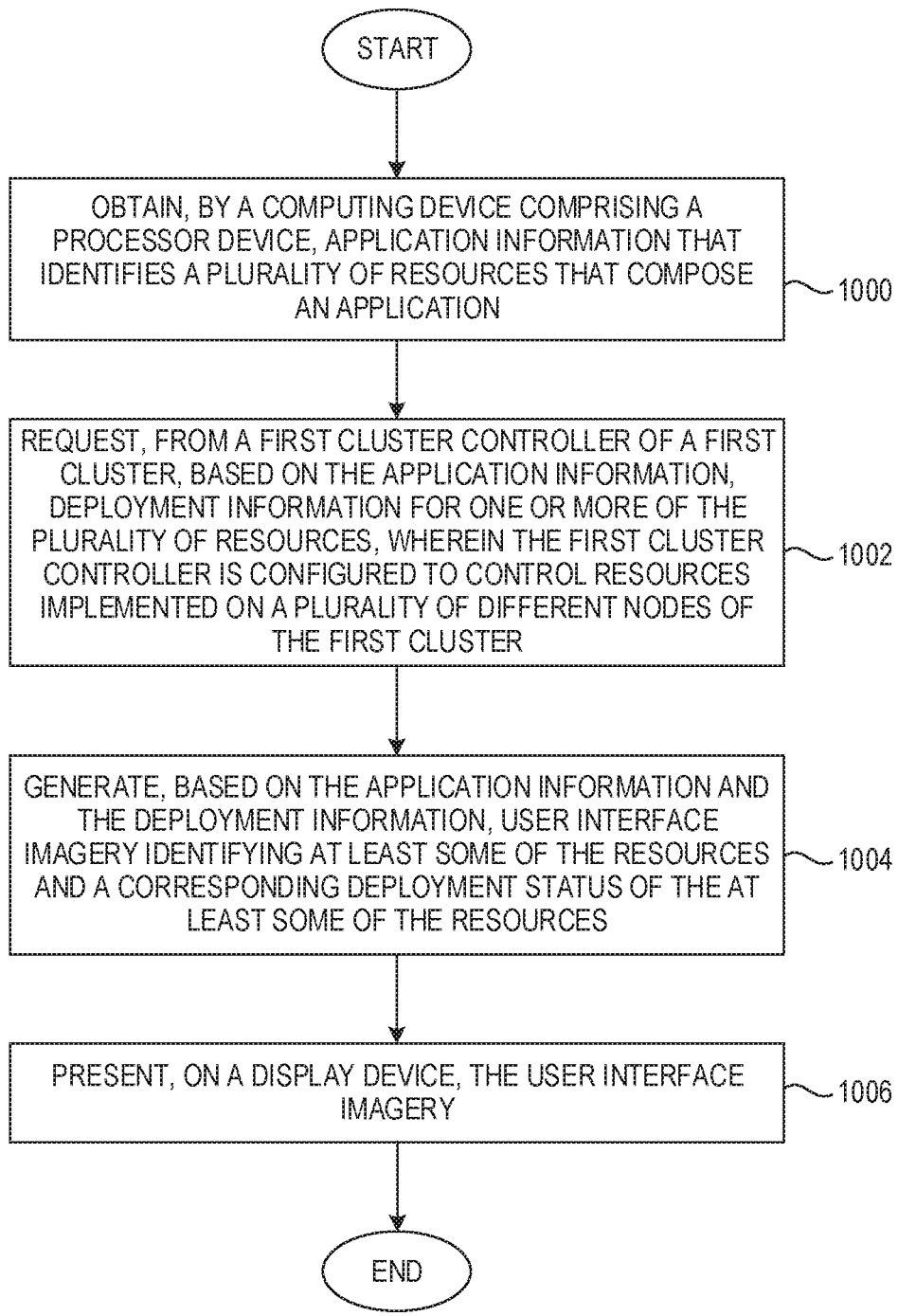
FIG. 2 is a flowchart of a method for introspection of an application in the runtime environment according to one example.

FIG. 2 is a flowchart of a method for introspection of the application 28-1 in the runtime environment 10 according to one implementation. FIG. 2 will be discussed in conjunction with FIG. 1. The computing device 12 obtains the application information 29 that identifies the plurality of resources 34, 36, 38, and 40 that compose the application 28-1 (FIG. 2, block 1000). The computing device 12 requests, from the cluster controller 24-1 of the cluster 22-1, based on the application information 29, deployment information for one or more of the plurality of resources 34, 36, 38, and 40, wherein the cluster controller 24-1 controls resources implemented on a plurality of different nodes 26-1-1-26-1-N of the cluster 22-1 (FIG. 2, block 1002). The computing device 12 generates, based on the application information 29 and the deployment information, the user interface imagery 44 identifying at least some of the resources 34, 36, 38, and 40 and a corresponding deployment status of the at least some of the resources 34, 36, 38, and 40 (FIG. 2, block 1004). The computing device 12 presents, on the display device 18, the user interface imagery 44 (FIG. 2, block 1006).

Figure 3:
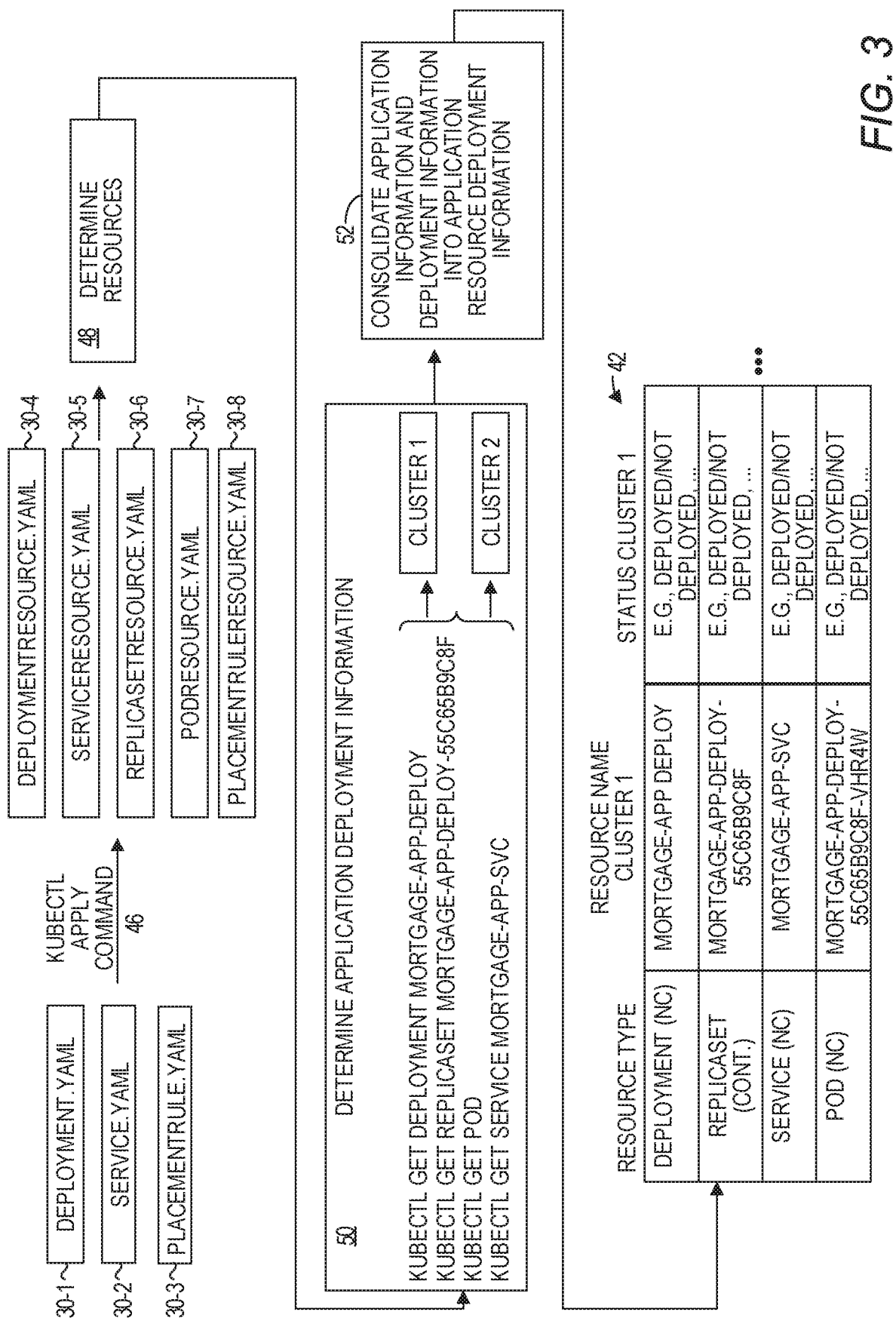
FIG. 3 is a block diagram illustrating a sequence of events that may occur in the runtime environment to implement the introspection of the application in the runtime environment according to one example.

FIG. 3 is a block diagram illustrating a sequence of events that may occur in the runtime environment 10 to implement the introspection of the application 28-1 in the runtime environment 10, according to one implementation. FIG. 3 will be discussed in conjunction with FIG. 1. The application 28-1 may initially comprise the container image 32 and the one or more pre-deployment YAML files 30-1-30-3. An operator, software engineer or other individual may generate the pre-deployment YAML files 30-1-30-3. The pre-deployment YAML files 30-1-30-3 define certain resources of the application 28-1, identify the container image 32 (in this example, "fxiang/mortgage:0.4.0"), and provide configuration information for the deployment of the application 28-1 on, in this implementation, the clusters 22-1 and 22-P.

An example of the YAML file 30-1 is provided below in Table 1.

TABLE 1

Deployment YAML
    apiVersion: apps/v1
    kind: Deployment
    metadata:
        name: mortgage-app-deploy
        labels:
            app: mortgage-app-mortgage
    spec:
        selector:
            matchLabels:
                app: mortgage-app-mortgage
            replicas: 1
            template:
                metadata:
                    labels:
                        app: mortgage-app-mortgage
                spec:
                    containers:

TABLE 1-continued

- name: mortgage-app-mortgage
  image: "fxiang/mortgage:0.4.0"
  imagePullPolicy: Always
  ports:
      - containerPort: 9080
  resources:
      limits:
          cpu: 200m
          memory: 256Mi
      request:
          cpu: 200m
          memory: 256Mi An example of the YAML file 30-2 is provided below in Table 2.

TABLE 2

Service YAML
    apiVersion: v1
    kind: Service
    metadata:
        name: mortgage-app-svc
        labels:
            app: mortgage-app-mortgage
    spec:
        type: NodePort
        ports:
            - port: 9080
              targetPort: 9080
              protocol: TCP
        selector:
            app: mortgage-app-mortgage An example of the YAML file 30-3 is provided below in Table 3.

TABLE 3

PlacementRule YAML
    apiVersion: apps.open-cluster-management.io/v1
    kind: PlacementRule
    metadata:
        annotations:
            kubectl.kubernetes.io/last-applied-configuration: >
                {"apiVersion":"apps.open-cluster-
management.io/v1","kind":"PlacementRule","metadata":{"annotation
s":{ },"labels":{"app":"mortgage-app-mortgage"},"name":"mortgage-
app-
placement","namespace":"default"},"spec":{"clusterReplicas":1 ,"clus
terSelector":{"matchLabels":{"environment":"Dev"}}}}
            open-cluster-management.io/user-group:
c3lzdGVtOmNsdXN0ZXItYWRtaW5zLHN5c3RlbTphdXRoZW50aW
NhdGVk
            open-cluster-management.io/user-identity: a3ViZTphZG1 pbg==
        creationTimestamp: '2020-10-25T15:55:27Z'
        generation: 3
        labels:
            app: mortgage-app-mortgage
        name: mortgage-app-placement
        namespace: default
        resourceversion: '20615718'
        selfLink: >-
            /apis/apps.open-cluster-
management.io/v1/namespaces/default/placementrules/mortgage-
app-placement
        uid: 3dc15a83-04d7-4697-9bcb-036af514a218
    spec:
        clusterReplicas: 2
        clusterSelector:
            matchLabels:
                vendor: OpenShift
    status:
        decisions:
            - clusterName: cluster1
              clusterNamespace: cluster1

TABLE 3-continued

- clusterName: cluster2
  clusterNamespace: cluster2

An operator may then issue one of more deployment commands 46 to start the deployment process. In this example, wherein the container orchestration system comprises the Kubernetes® container orchestration system, the deployment command 46 may comprise one or more KUBECTL APPLY commands that identify the YAML files 30-1-30-3. The deployment command(s) 46 causes the container orchestration system to generate the YAML files 30-4-30-8. Each of the YAML files 30-4-30-8 identify resources that will be used to implement functionality of the application 28-1. The container orchestration system then deploys, or attempts to deploy, the resources on the clusters 22-1 and 22-P.

The introspection service 20 may then be requested to determine the deployment status of the application 28-1. At block 48, the introspection service 20 accesses the YAML files 30-4-30-8 to identify the resources of the application 28-1. In this implementation, each of the YAML files 30-4-30-8 corresponds to a particular resource, and contains information about the corresponding resource, such as the name of the resource, the kind of the resource, and information relating to deploying the resource. The introspection service 20 parses the YAML files 30-4-30-8 to locate a value of a resource name variable to determine the name of each resource, and a resource kind variable to determine a resource kind of the resource. As an example, the YAML file 30-4 is reproduced below in Table 4.

TABLE 4

Deployment resource YAML apiVersion: apps/v1
kind: Deployment
metadata:
  annotations:
    apps.open-cluster-management.io/hosting-deployable:
mortgage-ch/mortgage-channel-Deployment-mortgage-app-deploy
    apps.open-cluster-management.io/hosting-subscription:
default/mortgage-app-subscription
    apps.open-cluster-management.io/sync-source: subgbk8s-
default/mortgage-app-subscription
    deployment.kubernetes.io/revision: '1'
  creationTimestamp: '2020-10-13T16:15:18Z'
  generation: 4406
  labels:
    app: mortgage-app-mortgage
  name: mortgage-app-deploy
  namespace: default
  resourceVersion: '185438249'
  selfLink:
/apis/apps/v1/namespaces/default/deployments/mortgage-app-
deploy
  uid: e922dcf9-a053-42be-85c3-b0a2859f0765
spec:
  progressDeadlineSeconds: 600
  replicas: 1
  revisionHistoryLimit: 10
  selector:
    matchLabels:
      app: mortgage-app-mortgage
  strategy:
    rollingUpdate:
      maxSurge: 25%
      maxUnavailable: 25%
    type: RollingUpdate
  template:
    metadata:
      creationTimestamp: null
      labels:
        app: mortgage-app-mortgage TABLE 4-continued Deployment resource YAML spec:
      containers:
        - image: 'fxiang/mortgage:0.4.0'
          imagePullPolicy: Always
          name: mortgage-app-mortgage
          ports:
            - containerPort: 9080
              protocol: TCP
          resources:
            limits:
              cpu: 200m
              memory: 256Mi
          terminationMessagePath: /dev/termination-log
          terminationMessagePolicy: File
      dnsPolicy: ClusterFirst
      restartPolicy: Always
      schedulerName: default-scheduler
      securityContext: { }
      terminationGracePeriodSeconds: 30

The introspection service 20 parses the YAML file 30-4 to determine the value of the variable "metadata.name", in this example, "mortgage-app-deploy", which is the name of the resource that corresponds to the YAML file 30-4. The introspection service 20 also parses the YAML file 30-4 to determine the value of the resource kind variable (e.g., "kind"), in this example "Deployment". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-5 is reproduced below in Table 5.

TABLE 5

Service resource YAML apiVersion: v1
kind: Service
metadata:
  annotations:
    apps.open-cluster-management.io/hosting-deployable:
mortgage-ch/mortgage-channel-Service-mortgage-app-svc
    apps.open-cluster-management.io/hosting-subscription:
default/mortgage-app-subscription
    apps.open-cluster-management.io/sync-source: subgbk8s-
default/mortgage-app-subscription
  creationTimestamp: '2020-10-13T16:15:17Z'
  labels:
    app: mortgage-app-mortgage
  name: mortgage-app-svc
  namespace: default
  resourceVersion: '185443982'
  selfLink: /api/v1/namespaces/default/services/mortgage-app-svc
  uid: 1347e26b-c1b2-4d24-aa4a-771e00ed40b4
spec:
  clusterIP: 172.30.193.153
  externalTrafficPolicy: Cluster
  ports:
    - nodePort: 31054
      port: 9080
      protocol: TCP
      targetPort: 9080
  selector:
    app: mortgage-app-mortgage
  sessionAffinity: None
  type: NodePort The introspection service 20 parses the YAML file 30-5 to determine the value of the resource name variable "metadata.name", in this example, "mortgage-app-svc", which is the name of the resource that corresponds to the YAML file 30-5. The introspection service 20 also parses the YAML file

30-5 to determine the value of the variable "kind", in this example "Service". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-6 is reproduced below in Table 6.

TABLE 6

Replicaset resource YAML

```
apiVersion: apps/v1
kind: ReplicaSet
metadata:
  annotations:
    apps.open-cluster-management.io/hosting-deployable:
mortgage-ch/mortgage-channel-Deployment-mortgage-app-deploy
    apps.open-cluster-management.io/hosting-subscription:
default/mortgage-app-subscription
    apps.open-cluster-management.io/sync-source: subgbk8s-
default/mortgage-app-subscription
    deployment.kubernetes.io/desired-replicas: '1'
    deployment.kubernetes.io/max-replicas: '2'
    deployment.kubernetes.io/revision: '1'
  creationTimestamp: '2020-10-13T16:15:18Z'
  generation: 1
  labels:
    app: mortgage-app-mortgage
    pod-template-hash: 55c65b9c8f
  name: mortgage-app-deploy-55c65b9c8f
  namespace: default
  ownerReferences:
    - apiVersion: apps/v1
      blockOwnerDeletion: true
      controller: true
      kind: Deployment
      name: mortgage-app-deploy
      uid: e922dcf9-a053-42be-85c3-b0a2859f0765
  resourceVersion: '182710344'
  selfLink: /apis/apps/v1/namespaces/default/replicasets/mortgage-
app-deploy-55c65b9c8f
  uid: be2845d8-6378-4933-99cb-6b2fa0c83077
spec:
  replicas: 1
  selector:
    matchLabels:
      app: mortgage-app-mortgage
      pod-template-hash: 55c65b9c8f
  template:
    metadata:
      creationTimestamp: null
      labels:
        app: mortgage-app-mortgage
        pod-template-hash: 55c65b9c8f
    spec:
      containers:
        - image: 'fxiang/mortgage:0.4.0'
          imagePullPolicy: Always
          name: mortgage-app-mortgage
          ports:
            - containerPort: 9080
              protocol: TCP
          resources:
            limits:
              cpu: 200m
              memory: 256Mi
          terminationMessagePath: /dev/termination-log
          terminationMessagePolicy: File
      dnsPolicy: ClusterFirst
      restartPolicy: Always
      schedulerName: default-scheduler
      securityContext: { }
      terminationGracePeriodSeconds: 30
```

The introspection service 20 parses the YAML file 30-6 to determine the value of the variable "metadata.name", in this example, "mortgage-app-deploy-55c65b9c8f", which is the name of the resource that corresponds to the YAML file 30-6. The introspection service 20 also parses the YAML file 30-6 to determine the value of the variable "kind", in this example "ReplicaSet". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The YAML file 30-7 is reproduced below in Table 7.

TABLE 7

Pod resource YAML

```
apiVersion: v1
kind: Pod
metadata:
  annotations:
    k8s.v1.cni.cncf.io/networks-status: |-
      [{
          "name": "openshift-sdn",
          "interface": "eth0",
          "ips": [
              "10.129.3.25"
          ],
          "dns": { },
          "default-route": [
              "10.129.2.1"
          ]
      }]
  creationTimestamp: '2020-10-13T16:15:18Z'
  generateName: mortgage-app-deploy-55c65b9c8f-
  labels:
    app: mortgage-app-mortgage
    pod-template-hash: 55c65b9c8f
  name: mortgage-app-deploy-55c65b9c8f-tm688
  namespace: default
  ownerReferences:
    - apiVersion: apps/v1
      blockOwnerDeletion: true
      controller: true
      kind: ReplicaSet
      name: mortgage-app-deploy-55c65b9c8f
      uid: be2845d8-6378-4933-99cb-6b2fa0c83077
  resourceVersion: '182710342'
  selfLink: /api/v1/namespaces/default/pods/mortgage-app-deploy-
55c65b9c8f-tm688
  uid: 83d508e6-113a-49e3-953b-4afceedd2523
spec:
  containers:
    - image: 'fxiang/mortgage:0.4.0'
      imagePullPolicy: Always
      name: mortgage-app-mortgage
      ports:
        - containerPort: 9080
          protocol: TCP
      resources:
        limits:
          cpu: 200m
          memory: 256Mi
        requests:
          cpu: 200m
          memory: 256Mi
      terminationMessagePath: /dev/termination-log
      terminationMessagePolicy: File
      volumeMounts:
        - mountPath: /var/run/secrets/kubernetes.io/serviceaccount
          name: default-token-94rv9
          readOnly: true
  dnsPolicy: ClusterFirst
  enableServiceLinks: true
  imagePullSecrets:
    - name: default-dockercfg-c65mr
  nodeName: ip-10-0-139-164.ec2.internal
  priority: 0
  restartPolicy: Always
  schedulerName: default-scheduler
  securityContext: { }
  serviceAccount: default
  serviceAccountName: default
```

TABLE 7-continued

Pod resource YAML

```
    terminationGracePeriodSeconds: 30
    tolerations:
    - effect: NoExecute
        key: node.kubernetes.io/not-ready
        operator: Exists
        tolerationSeconds: 300
    - effect: NoExecute
        key: node.kubernetes.io/unreachable
          operator: Exists
        tolerationSeconds: 300
    - effect: NoSchedule
        key: node.kubernetes.io/memory-pressure
        operator: Exists
    volumes:
    - name: default-token-94rv9
        secret:
          defaultMode: 420
          secretName: default-token-94rv9
```

The introspection service 20 parses the YAML file 30-7 to determine the value of the variable "metadata.name", in this example, "mortgage-app-deploy-55c65b9c8f-tm688", which is the name of the resource that corresponds to the YAML file 30-7. The introspection service 20 also parses the YAML file 30-7 to determine the value of the variable "kind", in this example "Pod". The introspection service 20 stores the resource name and resource kind. The introspection service 20 may also obtain the values of any other variables suitable for subsequent presentation to the operator on the display device 18, such as, by way of non-limiting example, metadata.namespace, or the like.

The introspection service 20 parses the YAML file 30-8 and determines that the application 28-1 is to be deployed on the clusters 22-1 and 22-P. At block 50, the introspection service 20 requests, from the cluster controllers 24-1, 24-P of the clusters 22-1, 22-P, respectively, deployment information for one or more of the resources that identifies the deployment status of the resources. The resources for which the introspection service 20 requests deployment information may be all resources, or may be predetermined kinds of resources, or may be all resources other than certain kinds of resources. The deployment information may be requested in a manner suitable and appropriate for the particular container orchestration system. In a Kubernetes® container orchestration system, the deployment information may be requested by sending the cluster controllers 24-1, 24-P kubectl get commands that include the resource kind and the resource name of the resource for which deployment information is desired. For example, for the deployment resource with the name "mortgage-app-deploy", the introspection service 20 may send each cluster controller 24-1, 24-P the following kubectl get command: "kubectl get deployment mortgage-app-deploy -o yaml". The cluster controllers 24-1, 24-P respectively access the deployment information for the resource 34 and respond with the deployment information to the introspection service 20. Table 8 is an example of the deployment information that may be returned by one of the cluster controllers 24-1, 24-P in response.

TABLE 8

Deployment cluster1 data

```
apiVersion: apps/v1
kind: Deployment
metadata:
    annotations:
        apps.open-cluster-management.io/hosting-deployable:
mortgage-ch/mortgage-channel-Deployment-mortgage-app-deploy
        apps.open-cluster-management.io/hosting-subscription:
```

TABLE 8-continued

Deployment cluster1 data

```
default/mortgage-app-subscription
        apps.open-cluster-management.io/sync-source: subgbk8s-
default/mortgage-app-subscription
        deployment.kubernetes.io/revision: '1'
    creationTimestamp: '2020-10-13T16:15:18Z'
    generation: 10017
    labels:
        app: mortgage-app-mortgage
    name: mortgage-app-deploy
    namespace: default
    resourceVersion: '189056239'
    selfLink:
/apis/apps/v1/namespaces/default/deployments/mortgage-app-
deploy
    uid:e922dcf9-a053-42be-85c3-b0a2859f0765
spec:
    progressDeadlineSeconds: 600
    replicas: 1
    revisionHistoryLimit: 10
    selector:
        matchLabels:
          app: mortgage-app-mortgage
    strategy:
    rollingUpdate:
          maxSurge: 25%
          maxUnavailable: 25%
    type: RollingUpdate
    template:
        metadata:
          creationTimestamp: null
          labels:
            app: mortgage-app-mortgage
        spec:
          containers:
            - image: 'fxiang/mortgage:0.4.0'
              imagePullPolicy: Always
              name: mortgage-app-mortgage
              ports:
                - containerPort: 9080
                  protocol: TCP
              resources:
                limits:
                  cpu: 200m
                  memory: 256Mi
              terminationMessagePath: /dev/termination-log
              terminationMessagePolicy: File
          dnsPolicy: ClusterFirst
          restartPolicy: Always
          schedulerName: default-scheduler
          securityContext: { }
          terminationGracePeriodSeconds: 30
status:
    availableReplicas: 1
    conditions:
        - lastTransitionTime: '2020-10-13T16:15:22Z'
          lastUpdateTime: '2020-10-13T16:15:22Z'
          message: Deployment has minimum availability.
          reason: MinimumReplicasAvailable
          status: 'True'
          type: Available
        - lastTransitionTime: '2020-10-13T16:15:18Z'
          lastUpdateTime: '2020-10-13T16:15:22Z'
          message: ReplicaSet "mortgage-app-deploy-55c65b9c8f" has
successfully progressed.
          reason: NewReplicaSetAvailable
          status: 'True'
          type: Progressing
    observedGeneration: 10017
    readyReplicas: 1
    replicas: 1
    updatedReplicas: 1
```

For the service resource with the name "mortgage-app-svc", the introspection service 20 may send each cluster controller 24-1, 24-P the following kubectl get command: "kubectl get service mortgage-app-svc -o yaml". The cluster controllers 24-1, 24-P respectively access the deployment information for the resource 36 and respond with the deployment information to the introspection service 20.

Table 9 is an example of the deployment information that may be returned by one of the cluster controllers 24-1, 24-P in response.

TABLE 9

Service cluster1 data apiVersion: v1
kind: Service
metadata:
    annotations:
        apps.open-cluster-management.io/hosting-deployable:
mortgage-ch/mortgage-channel-Service-mortgage-app-svc
        apps.open-cluster-management.io/hosting-subscription:
default/mortgage-app-subscription
        apps.open-cluster-management.io/sync-source: subgbk8s-
default/mortgage-app-subscription
    creationTimestamp: '2020-10-13T16:15:17Z'
    labels:
        app: mortgage-app-mortgage
    name: mortgage-app-svc
    namespace: default
    resourceVersion: '189066055'
    selfLink: /api/v1/namespaces/default/services/mortgage-app-svc
    uid: 1347e26b-c1b2-4d24-aa4a-771e00ed40b4
spec:
    clusterIP: 172.30.193.153
    externalTrafficPolicy: Cluster
    ports:
      - nodePort: 31490
        port: 9080
        protocol: TCP
        targetPort: 9080
    selector:
        app: mortgage-app-mortgage
    sessionAffinity: None
    type: NodePort
status:
    loadBalancer: { }

For the replicaset resource with the name "mortgage-app-deploy-55c65b9c8f", the introspection service 20 may send each cluster controller 24-1, 24-P the following kubectl get command: "kubectl get replicaset mortgage-app-deploy-55c65b9c8f -o yaml". The cluster controllers 24-1, 24-P respectively access the deployment information for the resource 38 and respond with the deployment information to the introspection service 20. Table 10 is an example of the deployment information that may be returned by one of the cluster controllers 24-1, 24-P in response.

TABLE 10

Replicaset cluster1 data apiVersion: apps/v1
kind: ReplicaSet
metadata:
    annotations:
        apps.open-cluster-management.io/hosting-deployable:
mortgage-ch/mortgage-channel-Deployment-mortgage-app-deploy
        apps.open-cluster-management.io/hosting-subscription:
default/mortgage-app-subscription
        apps.open-cluster-management.io/sync-source: subgbk8s-
default/mortgage-app-subscription
        deployment.kubernetes.io/desired-replicas: '1'
        deployment.kubernetes.io/max-replicas: '2'
        deployment.kubernetes.io/revision: '1'
    creationTimestamp: '2020-10-13T16:15:18Z'
    generation: 1
    labels:
        app: mortgage-app-mortgage
        pod-template-hash: 55c65b9c8f
    name: mortgage-app-deploy-55c65b9c8f
    namespace: default TABLE 10-continued Replicaset cluster1 data ownerReferences:
      - apiVersion: apps/v1
        blockOwnerDeletion: true
        controller: true
        kind: Deployment
        name: mortgage-app-deploy
        uid: e922dcf9-a053-42be-85c3-b0a2859f0765
    resourceVersion: '182710344'
    selfLink: /apis/apps/v1/namespaces/default/replicasets/mortgage-
app-deploy-55c65b9c8f
    uid: be2845d8-6378-4933-99cb-6b2fa0c83077
spec:
    replicas: 1
    selector:
        match Labels:
            app: mortgage-app-mortgage
            pod-template-hash: 55c65b9c8f
    template:
        metadata:
            creationTimestamp: null
            labels:
                app: mortgage-app-mortgage
                pod-template-hash: 55c65b9c8f
        spec:
            containers:
            - image: 'fxiang/mortgage:0.4.0'
              imagePullPolicy: Always
              name: mortgage-app-mortgage
              ports:
                - containerPort: 9080
                  protocol: TCP
              resources:
                limits:
                  cpu: 200m
                  memory: 256Mi
              terminationMessagePath: /dev/termination-log
              terminationMessagePolicy: File
            dnsPolicy: ClusterFirst
            restartPolicy: Always
            schedulerName: default-scheduler
            securityContext: { }
            terminationGracePeriodSeconds: 30
status:
    availableReplicas: 1
    fullyLabeledReplicas: 1
    observedGeneration: 1
    readyReplicas: 1
    replicas: 1

For the pod resource, the introspection service 20 may send the cluster controllers 24-1, 24-P a "kubectl get pod" command to determine the names of the pods that are deployed on the respective clusters 22-1, 22-P. Table 11 is an example of the deployment information that may be returned by one of the cluster controllers 24-1, 24-P in response.

TABLE 11

POD Deployment Information

| NAME | READY | STATUS | RESTARTS | AGE |
|---|---|---|---|---|
| apache-e9120-564c7bfbb7-pqtt7 | 1/1 | Running | 0 | 3 d 5 h |
| frontend-6cb7f8bd65-2fdwx | 1/1 | Running | 0 | 2 d 8 h |
| frontend-6cb7f8bd65-mq7kf | 1/1 | Running | 0 | 2 d 8 h |
| frontend-6cb7f8bd65-st9fn | 1/1 | Running | 0 | 2 d 8 h |
| mortgage-app-deploy-55c65b9c8f-tm688 | 1/1 | Running | 0 | 3 d 5 h |
| mortgagedc-deploy-1-deploy | 0/1 | Completed | 0 | 2 d 7 h |
| mortgagedc-deploy-1-t874x | 1/1 | Running | 0 | 2 d 7 h |
| redis-master-7db7f6579f-qpnm6 | 1/1 | Running | 0 | 2 d 8 h |
| redis-slave-5bdcfd74c7-fcvmp | 1/1 | Running | 0 | 2 d 8 h |
| redis-slave-5bdcfd74c7-tvxr4 | 1/1 | Running | 0 | 2 d 8 h |

The introspection service 20 may then analyze the names of the pods searching for a pod name that has, as a component of the pod name, the same name as the replicaset "mortgage-app-deploy-55c65b9c8f". In this example, the introspection service 20 identifies a pod with the name "mortgage-app-deploy-55c65b9c8f-tm688" The introspection service 20 may then send the cluster controllers 24-1, 24-P a "kubectl get pod mortgage-app-deploy-55c65b9c8f-tm688 -o yaml" command to obtain the deployment information for the pod resource 40. Table 12 is an example of the deployment information that may be returned by one of the cluster controllers 24-1, 24-P in response.

TABLE 12

Pod cluster1 data

```
apiVersion: v1
kind: Pod
metadata:
  annotations:
    k8s.v1.cni.cncf.io/networks-status: |-
      [{
          "name": "openshift-sdn",
          "interface": "eth0",
          "ips": [
             "10.129.3.25"
          ],
          "dns": { },
          "default-route": [
             "10.129.2.1"
          ]
      }]
  creationTimestamp: '2020-10-13T16:15:18Z'
  generateName: mortgage-app-deploy-55c65b9c8f-
  labels:
    app: mortgage-app-mortgage
    pod-template-hash: 55c65b9c8f
  name: mortgage-app-deploy-55c65b9c8f-tm688
  namespace: default
  ownerReferences:
    - apiVersion: apps/v1
      blockOwnerDeletion: true
      controller: true
      kind: ReplicaSet
      name: mortgage-app-deploy-55c65b9c8f
      uid: be2845d8-6378-4933-99cb-6b2fa0c83077
  resourceVersion: '182710342'
  selfLink: /api/v1/namespaces/default/pods/mortgage-app-deploy-55c65b9c8f-tm688
  uid: 83d508e6-113a-49e3-953b-4afceedd2523
spec:
  containers:
    - image: 'fxiang/mortgage:0.4.0'
      imagePullPolicy: Always
      name: mortgage-app-mortgage
      ports:
        - containerPort: 9080
          protocol: TCP
```

TABLE 12-continued

Pod cluster1 data

```
      resources:
        limits:
          cpu: 200m
          memory: 256Mi
        requests:
          cpu: 200m
          memory: 256Mi
      terminationMessagePath: /dev/termination-log
      terminationMessagePolicy: File
      volumeMounts:
        - mountPath: /var/run/secrets/kubernetes.io/serviceaccount
          name: default-token-94rv9
          readOnly: true
  dnsPolicy: ClusterFirst
  enableServiceLinks: true
  imagePullSecrets:
    - name: default-dockercfg-c65mr
  nodeName: ip-10-0-139-164.ec2.internal
  priority: 0
  restartPolicy: Always
  schedulerName: default-scheduler
  securityContext: { }
  serviceAccount: default
  serviceAccountName: default
  terminationGracePeriodSeconds: 30
  tolerations:
    - effect: NoExecute
      key: node.kubernetes.io/not-ready
      operator: Exists
      tolerationSeconds: 300
    - effect: NoExecute
      key: node.kubernetes.io/unreachable
      operator: Exists
      tolerationSeconds: 300
    - effect: NoSchedule
      key: node.kubernetes.io/memory-pressure
      operator: Exists
  volumes:
    - name: default-token-94rv9
      secret:
        defaultMode: 420
        secretName: default-token-94rv9
status:
  conditions:
    - lastProbeTime: null
      lastTransitionTime: '2020-10-13T16:15:18Z'
      status: 'True'
      type: Initialized
    - lastProbeTime: null
      lastTransitionTime: '2020-10-13T16:15:22Z'
      status: 'True'
      type: Ready
    - lastProbeTime: null
      lastTransitionTime: '2020-10-13T16:15:22Z'
      status: 'True'
      type: ContainersReady
```

TABLE 12-continued

Pod cluster1 data

```
    - lastProbeTime: null
      lastTransitionTime: '2020-10-13T16:15:18Z'
      status: 'True'
      type: PodScheduled
    containerstatuses:
    - containerID: 'cri-
o://74ed9258135090bc0a8489653230add77fea9fbd0516183264d0
4e20bb156622'
      image: 'docker.io/fxiang/mortgage:0.4.0'
      imageID: >-
        docker.io/fxiang/mortgage@sha256:8d44359dd4c6d0aedb7e3
59726e9685cf56e77bbaeacfe94e06fa357fe9cb2e3
      lastState: { }
      name: mortgage-app-mortgage
      ready: true
      restartCount: 0
      started: true
      state:
        running:
          startedAt: '2020-10-13T16:15:22Z'
    hostIP: 10.0.139.164
    phase: Running
    podIP: 10.129.3.25
    podIPs:
      - ip: 10.129.3.25
    qosClass: Guaranteed
    startTime: '2020-10-13T16:15:18Z'
```

At block 52, the introspection service 20 may correlate and consolidate the application information 29 and the deployment information received from the cluster controllers 24-1 and 24-P to generate application resource deployment information 42. The application resource deployment information 42 may maintain, for each resource, information obtained from the corresponding YAML file 30-4-30-8, and deployment information obtained from the cluster controllers 24-1 and 24-P. The introspection service 20 may use the application resource deployment information 42 to, for example, generate the user interface imagery 44 that identifies some of the resources and the deployment status of the resources.

Figure 4A:
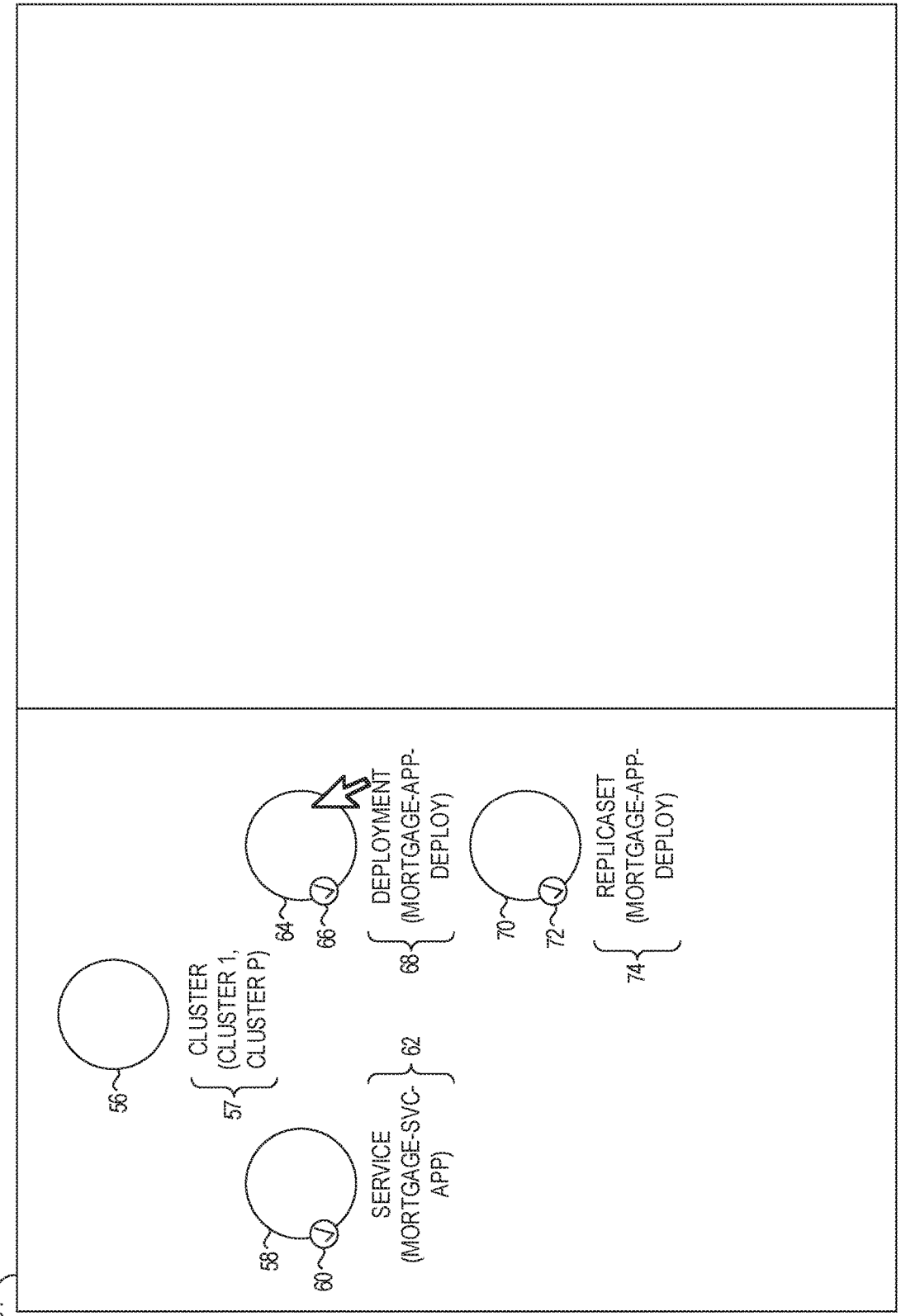
FIGS. 4A-4D illustrate various user interface imagery that may be presented on a display device according to one example.

FIGS. 4A-4D illustrate various user interface imagery that may be presented on the display device 18 in accordance with one implementation. Referring first to FIG. 4A, in response to an operator input, the introspection service 20 may generate an initial user interface imagery 54 that includes a cluster resource icon 56 that represents the clusters 22-1 and 22-P, and text 57 that identifies the clusters 22 on which the application 28-1 has been deployed. A service resource icon 58 corresponds to the service resource 36 and includes a successful deployment indicator 60 to indicate that the service resource 36 has been successfully deployed on the clusters 22-1 and 22-P. A different indicator may be used to indicate that the service resource 36 was not deployed successfully on either the cluster 22-1 or the 22-P, and another indicator may be used to indicate that the service resource 36 was deployed successfully on one of the clusters 22-1, 22-P but not on the other cluster 22-1, 22-P. Text 62 identifies the resource kind (service) and the name (mortgage-svc-app) of the service resource 36.

A deployment resource icon 64 corresponds to the deployment resource 34 and includes a successful deployment indicator 66 to indicate that the deployment resource 34 has been successfully deployed on the clusters 22-1 and 22-P. Text 68 identifies the resource kind (deployment) and the name (mortgage-app-deploy) of the deployment resource 34. A replicaset resource icon 70 corresponds to the replicaset resource 38 and includes a successful deployment indicator 72 to indicate that the replicaset resource 38 has been successfully deployed on the clusters 22-1 and 22-P. Text 74 identifies the resource kind (replicaset) and the name (mortgage-app-deploy) of the replicaset resource 38. In this example, the full name of the replicaset resource 38 "mortgage-app-deploy-55c65b9c8f" has been truncated to remove the "55c65b9c8f" portion of the name.

Figure 4B:
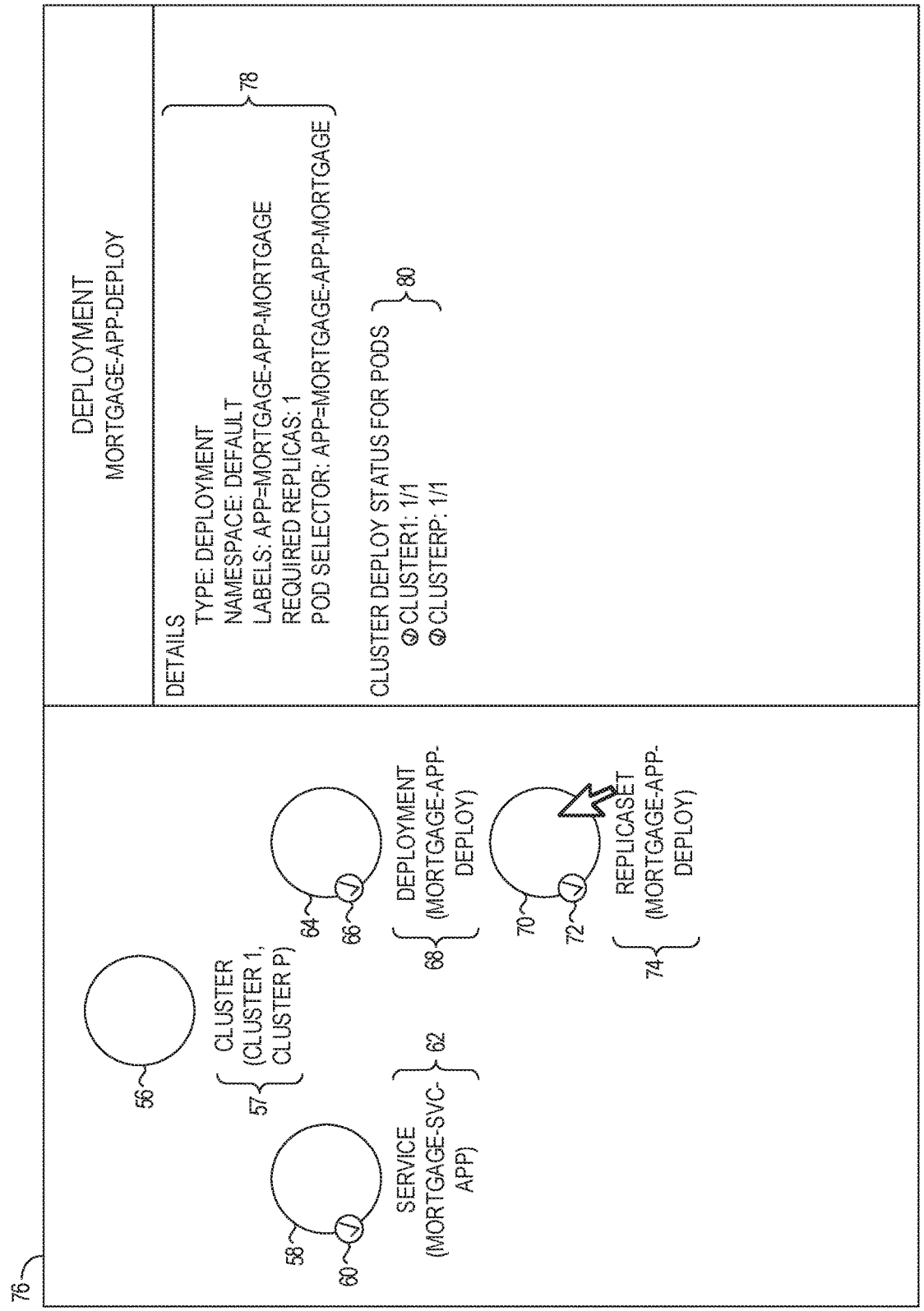

Assume for purposes of illustration that the operator selects the deployment resource icon 64, such as by using a mouse or other input mechanism. Referring now to FIG. 4B, in response to the selection of the deployment resource icon 64, the introspection service 20 generates and presents user interface imagery 76 on the display device 18. The user interface imagery 76 includes a details section 78, which is derived from the YAML file 30-4, and a deployment status 80 that identifies the deployment status of the deployment resource 34 on the clusters 22-1 and 22-P. The deployment status 80 was derived from the deployment information received from the cluster controllers 24-1 and 24-P. In this example, the value "1" prior to the "I" identifies a "ready deployment status", and the value "1" after the "I" identifies a desired deployment status. While for purposes of illustration only certain information is provided in the details section 78 and the deployment status 80, it will be appreciated that the introspection service 20 may provide any suitable information from the YAML file 30-4 in the details section 78 and may provide any suitable information from the deployment information received from the cluster controllers 24-1 and 24-P in the deployment status 80.

Figure 4C:
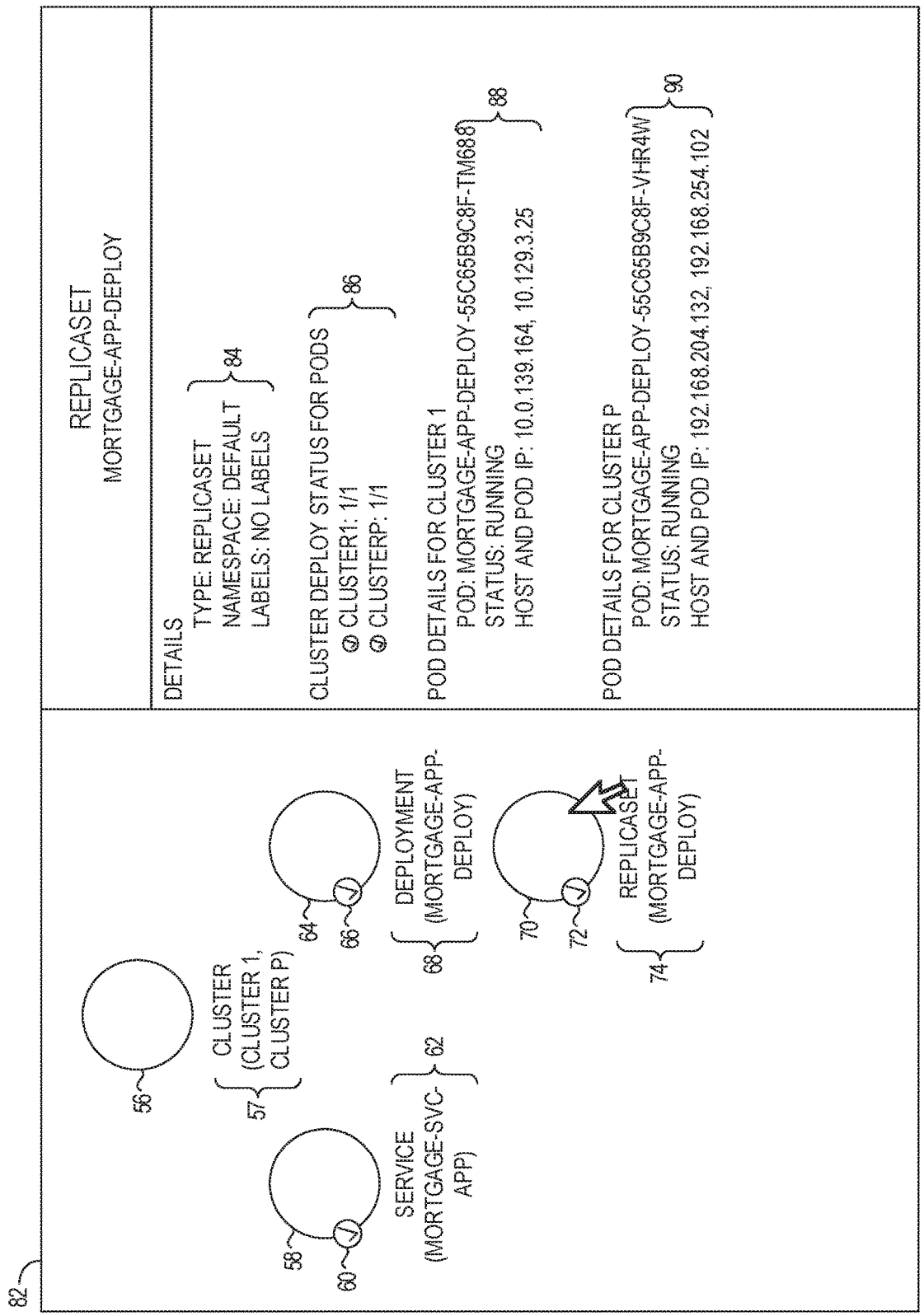

Assume for purposes of illustration that the operator selects the replicaset resource icon 70. Referring now to FIG. 4C, in response to the selection of the replicaset resource icon 70, the introspection service 20 generates and presents user interface imagery 82 on the display device 18. The user interface imagery 82 includes a details section 84 that is derived from the YAML file 30-6, a deployment status 86 that identifies the deployment status of the pod resources 40, a pod details 88 that provides the detail of the pod resource 40 on the cluster 22-1 and a pod details 90 that provides the detail of the pod resource 40 on the cluster 22-P. The deployment status 86 and pod details 88, 90 were derived from the deployment information received from the cluster controllers 24-1 and 24-P.

Figure 4D:
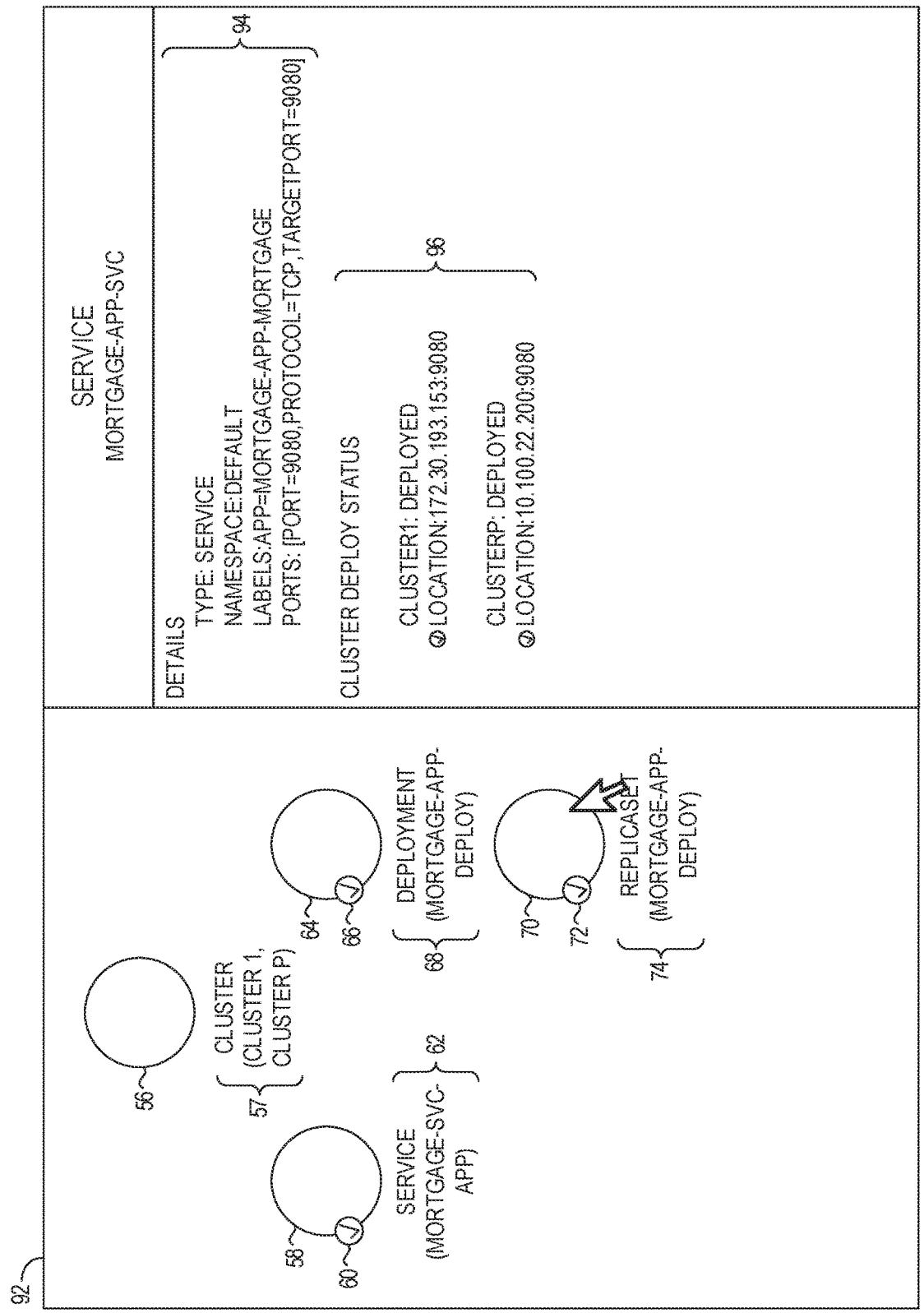

Assume for purposes of illustration that the operator selects the service resource icon 58. Referring now to FIG. 4D, in response to the selection of the service resource icon 58, the introspection service 20 generates and presents user interface imagery 92 on the display device 18. The user interface imagery 92 includes a details section 94 that is derived from the YAML file 30-5, and a deployment status 96 that identifies the deployment status of the service resource 36 on each of the clusters 22-1, 22-P. The deployment status 96 was derived from the deployment information received from the cluster controllers 24-1 and 24-P.

Figure 5:
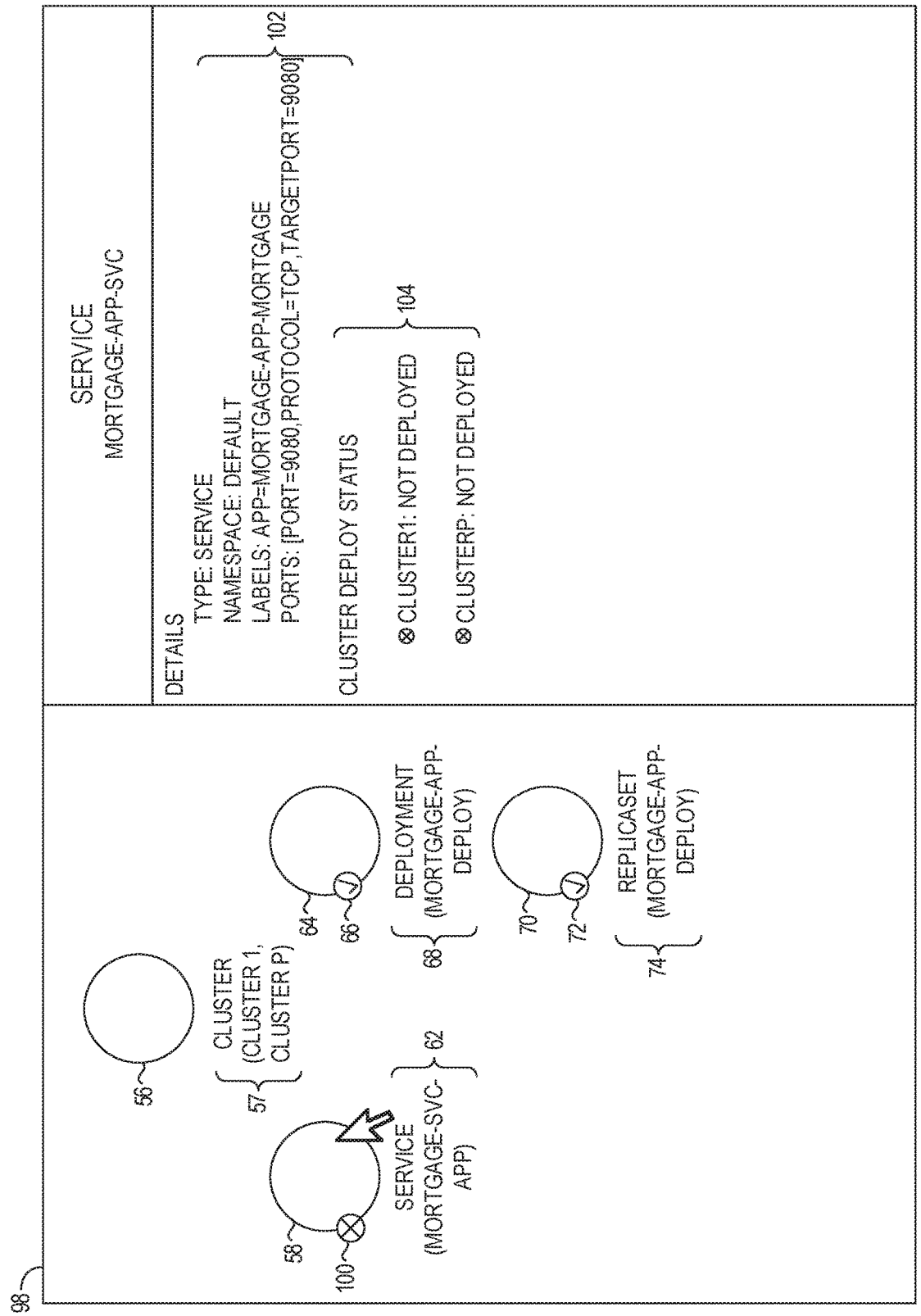
FIG. 5 illustrates user interface imagery that may be presented on a display device according to another example.

FIG. 5 illustrates user interface imagery 98 that may be presented on the display device 18 in accordance with another example. In this example, the deployment of the service resource was unsuccessful. The service resource icon 58 includes an unsuccessful deployment indicator 100 that indicates that the service resource was not successfully deployed. The user interface imagery 98 includes a details section 102 that is derived from the YAML file 30-5, and a deployment status 104 that indicates that the service resource was not deployed on either the cluster 22-1 or the cluster 22-P. The deployment status 104 was derived from the response from the cluster controllers 24-1 and 24-P in response to deployment information for the service resource.

Figure 6:
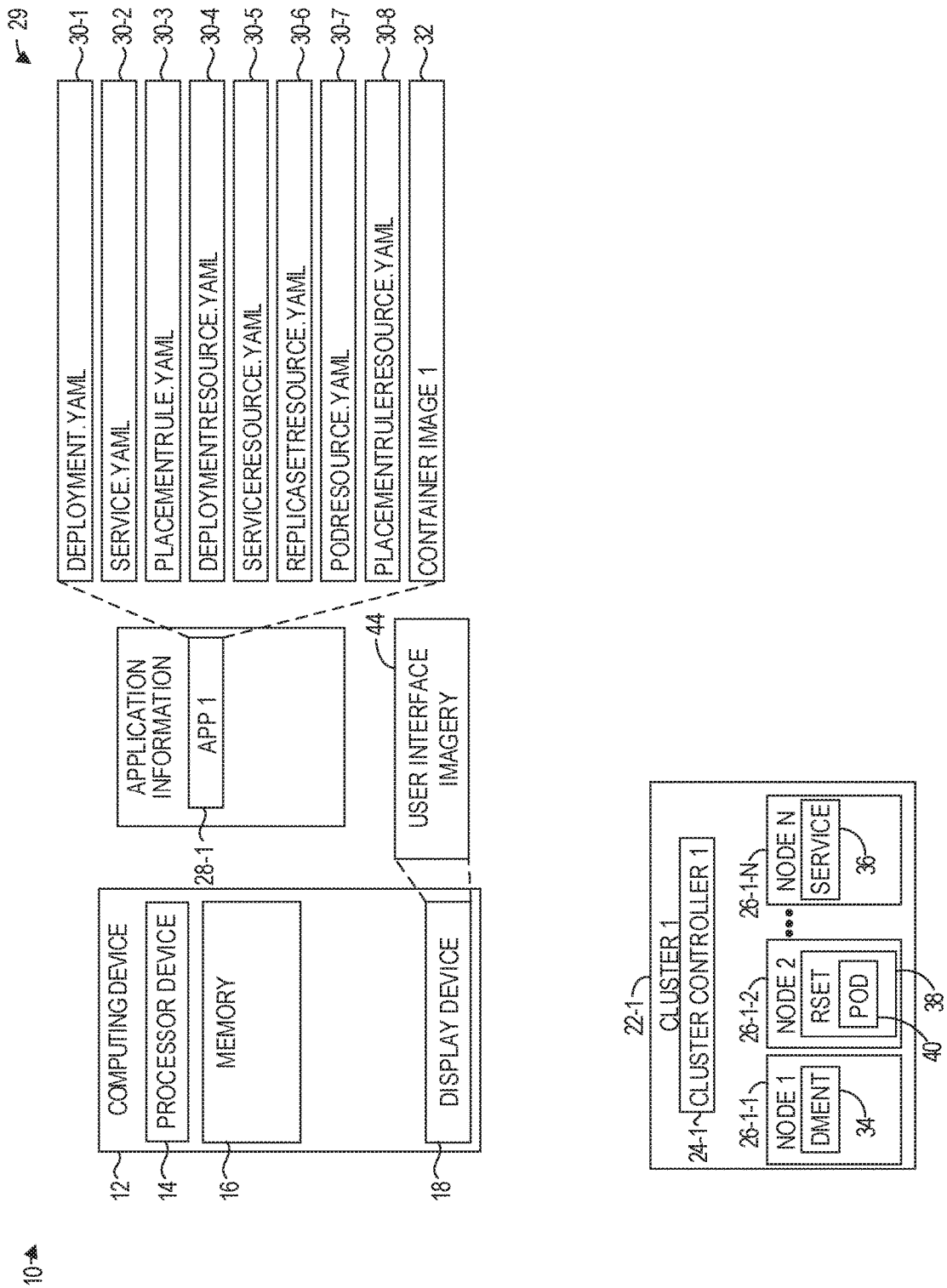
FIG. 6 is a simplified block diagram of the runtime environment illustrated in FIG. 1 according to one example.

FIG. 6 is a simplified block diagram of the environment 10 according to one implementation. The environment 10 includes the computing device 12, the memory 16, and the processor device 14 coupled to the memory 16 to obtain the application information 29 that identifies a plurality of resources that compose the application 28-1. The processor device 14 is further to request, from the cluster controller 24-1 of the cluster 22-1, based on the application information 29, deployment information for one or more of the plurality of resources, wherein the first cluster controller 24-1 is configured to control resources implemented on the plurality of different nodes 26-1-1-26-1-N of the cluster 22-1. The processor device 14 is further to generate, based on the application information 29 and the deployment information, user interface imagery 44 identifying at least some of the resources and a corresponding deployment status of the at least some of the resources. The processor device 14 is further to present, on the display device 18, the user interface imagery 44.

Figure 7:
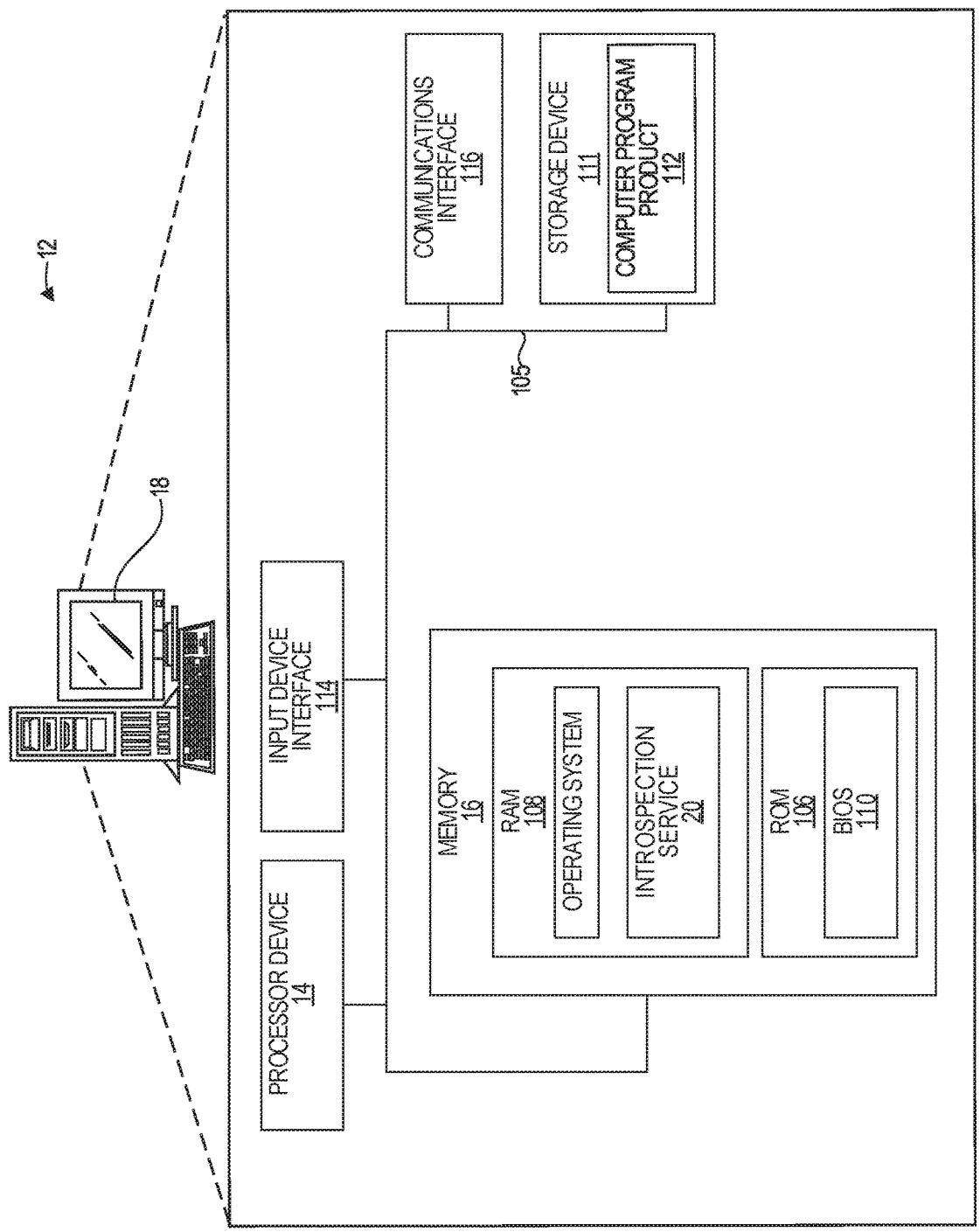
FIG. 7 is a block diagram of the computing device illustrated in FIG. 1 suitable for implementing examples according to one example.

FIG. 7 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 105. The system bus 105 provides an interface for system components including, but not limited to, the system memory 16 and the processor device 14. The processor device 14 can be any commercially available or proprietary processor.

The system bus 105 may be any of several types of bus structures that may further interconnect to a memory bus (with or without a memory controller), a peripheral bus, and/or a local bus using any of a variety of commercially available bus architectures. The system memory 16 may include non-volatile memory 106 (e.g., read-only memory (ROM), erasable programmable read-only memory (EPROM), electrically erasable programmable read-only memory (EEPROM), etc.), and volatile memory 108 (e.g., random-access memory (RAM)). A basic input/output system (BIOS) 110 may be stored in the non-volatile memory 106 and can include the basic routines that help to transfer information between elements within the computing device 12. The volatile memory 108 may also include a high-speed RAM, such as static RAM, for caching data.

The computing device 12 may further include or be coupled to a non-transitory computer-readable storage medium such as a storage device 111, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 111 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 111 and in the volatile memory 108, including an operating system and one or more program modules, such as the introspection service 20, which may implement the functionality described herein in whole or in part.

All or a portion of the examples may be implemented as a computer program product 112 stored on a transitory or non-transitory computer-usable or computer-readable storage medium, such as the storage device 111, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the introspection service 20 in the volatile memory 108, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as the display device 18. Such input devices may be connected to the processor device 14 through an input device interface 114 that is coupled to the system bus 105 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 116, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   obtaining, by a computing device comprising a processor device, application information that identifies a plurality of resources that compose an application, wherein obtaining the application information comprises:
      accessing one or more files, each file of the one or more files corresponding to one or more of the resources of the plurality of resources; and
      parsing each respective file of the one or more files to identify one or more resource names that identify the one or more resources to which the respective one or more files correspond;
   requesting, from a plurality of cluster controllers, based on the application information, deployment information for one or more of the plurality of resources, wherein each respective cluster controller of the plurality of cluster controllers is configured to control resources implemented on a plurality of different nodes of a respective cluster;
   generating, based on the application information and the deployment information, first user interface imagery identifying at least some of the resources and a corresponding deployment status of the at least some of the resources on each cluster of the plurality of clusters;
   presenting, on a display device, the first user interface imagery;
   receiving a user input that selects a first resource of the plurality of resources; and in response to the user input, generating second user interface imagery that identifies a deployment status of the first resource for each cluster of the plurality of clusters.

2. The method of claim 1 wherein parsing each respective file to identify the one or more resource names that identify the one or more resources to which the respective file corresponds further comprises parsing each respective file to locate one or more resource name variables.

3. The method of claim 1 wherein obtaining the application information further comprises:
parsing each respective file to identify one or more resource kind variables that identify one or more resource kinds of the one or more resources to which the respective file corresponds.

4. The method of claim 3 wherein requesting, from the plurality of cluster controllers, the deployment information for the one or more resources further comprises:
providing, to each cluster controller of the plurality of cluster controllers, for the one or more resources, the resource name of the resource and the resource kind of the resource.

5. The method of claim 1 wherein the first user interface imagery identifies, for each respective resource of the at least some of the resources, a resource kind.

6. The method of claim 1 wherein at least one cluster of the plurality of clusters comprises a Kubernetes cluster.

7. A computing device, comprising:
a memory; and
a processor device coupled to the memory to:
obtain application information that identifies a plurality of resources that compose an application, wherein obtaining the application information comprises:
accessing one or more files, each file of the one or more files corresponding to one or more of the resources of the plurality of resources; and
parsing each respective file of the one or more files to identify one or more resource names that identifies the one or more resources to which the respective one or more files correspond;
request, from a plurality of cluster controllers, based on the application information, deployment information for one or more of the plurality of resources, wherein each respective cluster controller of the plurality of cluster controllers is configured to control resources implemented on a plurality of different nodes of the respective cluster;
generate, based on the application information and the deployment information, first user interface imagery identifying at least some of the resources and a corresponding deployment status of the at least some of the resources on each cluster of the plurality of clusters;
present, on a display device, the first user interface imagery;
receive a user input that selects a first resource of the plurality of resources; and
in response to the user input, generate second user interface imagery that identifies a deployment status of the first resource for each cluster of the plurality of clusters.

8. The computing device of claim 7 wherein to parse each respective file to identify the one or more resource names that identify the one or more resources to which the respective file corresponds, the processor device is further to parse each respective file to locate one or more resource name variables.

9. The computing device of claim 7 wherein the first user interface imagery identifies, for each respective resource of the at least some of the resources, a resource kind.

10. The computing device of claim 7 wherein at least one cluster of the plurality of clusters comprises a Kubernetes cluster.

11. A non-transitory computer-readable storage medium that includes executable instructions to cause a processor device to:
obtain application information that identifies a plurality of resources that compose an application, wherein obtaining the application information comprises:
accessing one or more files, each file of the one or more files corresponding to one or more of the resources of the plurality of resources; and
parsing each respective file of the one or more files to identify one or more resource names that identifies the one or more resources to which the respective one or more files correspond;
request, from a plurality of cluster controllers, based on the application information, deployment information for one or more of the plurality of resources, wherein each respective cluster controller of the plurality of cluster controllers is configured to control resources implemented on a plurality of different nodes of the respective cluster;
generate, based on the application information and the deployment information, first user interface imagery identifying at least some of the resources and a corresponding deployment status of the at least some of the resources on each cluster of the plurality of clusters;
present, on a display device, the first user interface imagery;
receive a user input that selects a first resource of the plurality of resources; and
in response to the user input, generate second user interface imagery that identifies a deployment status of the first resource for each cluster of the plurality of clusters.

12. The non-transitory computer-readable storage medium of claim 11 wherein to parse each respective file to identify the one or more resource names that identify the one or more resources to which the respective file corresponds, the instructions further cause the processor device to parse each respective file to locate one or more resource name variables.

13. The non-transitory computer-readable storage medium of claim 11 wherein the first user interface imagery identifies, for each respective resource of the at least some of the resources, a resource kind.

* * * * *